United States Patent [19]

Burke

[11] 4,179,137

[45] Dec. 18, 1979

[54] ADJUSTABLE STEERING COLUMN FOR VEHICLES

[75] Inventor: Harold J. Burke, Saginaw, Mich.

[73] Assignee: General Motors Corporation, Detroit, Mich.

[21] Appl. No.: 937,485

[22] Filed: Aug. 28, 1978

[51] Int. Cl.$^2$ ................................................ B62D 1/18
[52] U.S. Cl. .................................... 280/775; 74/493; 280/779
[58] Field of Search ............... 280/775, 776, 777, 779, 280/780; 74/492, 493

[56] References Cited

U.S. PATENT DOCUMENTS

| | | | |
|---|---|---|---|
| 3,533,302 | 10/1970 | Hansen | 74/493 |
| 3,955,439 | 5/1976 | Meyer | 280/775 |
| 3,977,692 | 8/1976 | Findley | 280/775 |
| 4,075,903 | 2/1978 | Cornell | 74/493 |

Primary Examiner—Joseph F. Peters, Jr.
Assistant Examiner—John A. Carroll
Attorney, Agent, or Firm—Charles R. White

[57] ABSTRACT

A tilt and translating steering column assembly for vehicles in which an inner tube rectilinear in cross section is mounted for sliding movement with respect to an outer tube. The inner tube is selectively locked relative to the outer tube by an angular clamping shoe which is actuated by a camming device which diagonally forces the inner and outer tube into frictional engagement with angular and opposing sides of the two tubes. This device permits the two tubes to be quickly and readily adjusted to an infinite number of positions. The inner tube carries a steering column housing and steering wheel which can be linearly moved relative to the fixed outer tube to suit driver requirement.

4 Claims, 4 Drawing Figures

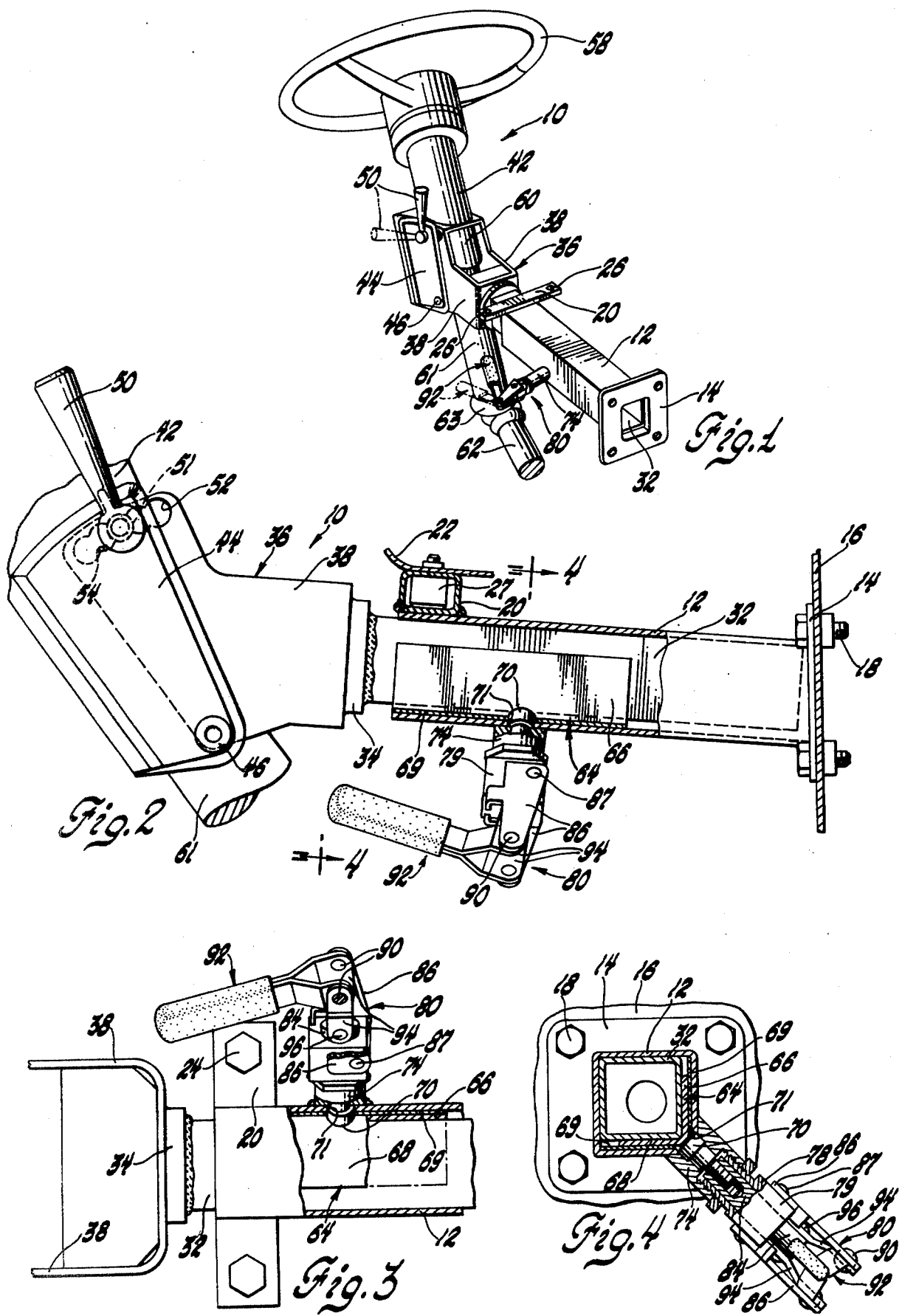

ADJUSTABLE STEERING COLUMN FOR VEHICLES

BACKGROUND OF THE INVENTION

This invention relates to vehicle steering columns and more particularly to a new and improved adjustable steering column having a no-lash translating assembly allowing the quick linear adjustment of column components so that the steering wheel may be selectively and easily positioned at an infinite number of positions by the driver to suit driver requirements.

Prior to the present invention, various translating devices have been proposed for vehicle steering column adjustment to allow the driver to adjust the position of the steering wheel to suit his arm position and to adjust the seat to steering wheel clearances. While many of these devices are meritorious, they frequently have clearance in their adjustment that causes looseness in the steering column assembly. While this does not adversely affect steering operations, it has been a goal to provide straight forward and simplified steering column construction in which looseness and play between mating adjustment components is minimized to improve the stability of steering column components at all adjusted positions.

SUMMARY OF THE INVENTION

Accordingly, it is a feature, object and advantage of this invention to provide a steering column assembly having new and improved support construction featuring a stable axial length adjustment for translatory movement of the steering column housing and steering wheel. More specifically, it is a feature, object and advantage of this invention to provide new and improved telescoping support tubes to adjust the near and far location of the steering wheel with respect to the vehicle driver to suit the physique and steering comfort requirements of individual drivers.

Another feature, object and advantage of this invention is to provide a new and improved adjustable steering column in which radial and axial lash between support components of the column is substantially eliminated and in which an infinite number of stabilized axial length adjustments is provided.

Another feature, object and advantage of this invention is to provide a new and improved adjustable steering column assembly having a rectilinear inner tube which may be rigidly clamped inside of a rectilinear outer tube by a suitable clamping device. When the clamping device is released, the assembly is free to be manually translated. The rigid clamping is accomplished by forcing the inner tube into the diagonal corner of the outer tube with an opposing and conforming angular brakeshoe. The brakeshoe exerts high clamping pressure supplied by a suitable clamping device. This clamping may be described as a square section tube captured and clamped across diagonal corners between two opposing and conforming sections that function as a V-block. With this arrangement, substantially all radial and axial lash is eliminated when the inner and outer tubes are clamped together.

BRIEF DESCRIPTION OF THE DRAWINGS

These and other features, objects and advantages of this invention will become more apparent from the following detailed description and drawings in which:

FIG. 1 is a perspective view of an adjustable steering column constructed in accordance with this invention;

FIG. 2 is a side elevational view partly in cross section of a portion of the column of FIG. 1;

FIG. 3 is a bottom plan view partly in cross section of a portion of the steering column of FIG. 1; and FIG. 4 is a cross sectional view taken along lines 4—4 of FIG. 2 as viewed in direction of the indicator arrows.

DESCRIPTION OF THE PREFERRED EMBODIMENT

Turning now in greater detail to the drawings, FIGS. 1 and 2 illustrate a steering column assembly 10 having an elongated outer support tube 12 of a suitable metallic stock material that is rectilinear in cross section. This outer support tube extends longitudinally in a cab of a truck or other vehicle and has a forward end welded or otherwise secured to a flat base 14 that, in turn, is secured to a forward wall 16 of the cab by nut and bolt fasteners 18. The upper rearward end of the outer support tube carries a laterally extending and tubular mounting bracket 20 which is secured to the bottom wall 22 of an instrument panel by threaded fasteners 24. These fasteners extend through openings 26 which are adjacent opposite ends of bracket 20 while cylindrical spacers 27, which accommodate the fasteners 24, are disposed internally of the mounting bracket as shown in FIG. 2.

The outer support tube 12 projects upwardly and at a slight angle from the front wall 16 of the cab and is spaced at a selected height with respect to the cab floor, not illustrated. Slidably mounted in the outer support tube is an inner support tube 32 of metallic stock which is rectilinear in cross section and slightly smaller than the cross section of the outer tube to provide clearances to permit the linear sliding movement of the inner support tube with respect to the outer support tube. The rearward end of the inner support tube 32 projecting outwardly from support tube 12 is welded to the end plate 34 of a bracket 36. This bracket has a pair of side plates 38 which are laterally spaced from one another and which extend rearwardly and then upwardly from the end plate 34. The bracket 36 supports a tiltable steering column housing 42 which has at its lower end a pair of laterally spaced side plates 44 that fit over the side plates 38 of the bracket 36. The forward corners of side plates 44 have inwardly extending pivot bosses 46 which extend into suitable circular pivot openings in the side plates of bracket 36 to pivotally mount the column housing 42 to the bracket 36.

A conventional lock and lock release construction is provided to permit the operator to tilt and lock the column at various positions with respect to the support tubes and bracket 36. A suitable tilt column lock and release mechanism, which may be employed in the preferred embodiment of this invention, is illustrated and described on page 3B-35 of the 1977 GMC Truck Service Manual #X7734 which is hereby incorporated by reference. Generally, this lock and release mechanism comprises a locking lever 50 mounted adjacent to one of the side plates 44. This lever is drivingly connected to a laterally extending locking rod 51. Locking rod 51 projects through aligned arcuate slots 52 formed in the side plates 38 of the bracket 36. These arcuate slots have circular enlarged openings 54 at spaced stations along the arc of slot 52 which accommodate the large diameter of the locking rod when the handle is positioned at the upward position shown in FIGS. 1 and 2 so that the column is thereby secured in adjusted tilt position. By manually turning the handle downwardly to the phantom line position, the locking rod is turned so that a reduced diameter portion in the locking rod will fit in the gates of the arcuate slots connecting the circular enlarged openings 54. This clearance allows locking rod passage and the column to be manually tilted to a new adjusted position. After the adjusted position is obtained, the handle is released and a torsion spring, not shown, will return the handle 50 to its upward position in which the locking rod is turned to closely fit the selected circular openings 54 to thereby secure the steering column housing in a selected tilt position.

The steering column housing 42 has mounted at its upper end a manual steering wheel 58 that is operatively connected to an upper steering shaft 60 which extends through the column housing 42 and which is connected to an intermediate steering shaft 61 through a constant velocity universal joint, not illustrated.

The intermediate shaft 61 is connected to a lower steering shaft 62 by constant velocity universal joint 63. The lower shaft 62 is connected by conventional steering gear and steering linkage to the dirigible wheels of the vehicle. By manually turning the steering wheel, the dirigible wheels of the vehicle are turned for vehicle steering purposes as will be understood by those skilled in the art.

To provide for the translating adjustment of the steering wheel and the steering column housing at any of its tilt positions toward and away from the operator for operator comfort and to adjust seat to steering wheel clearance, this invention provides for the linear telescopic movement of the inner support tube relative to the outer support tube. Furthermore, to releasably secure the support tubes and the steering column in any selected position without radial or axial lash, this invention importantly provides a new and improved friction brake construction interposed between the two support tubes.

More particularly, there is a right angular metallic brakeshoe 64 interposed between the inner and outer support tubes 12 and 32 which is actuable to frictionally and securely hold these two tubes in a selected telescoped position without radial or axial lash. This brakeshoe has a vertical side 66 that extends between the right vertical walls of the inner and outer support tubes and a horizontal side 68 that extends between the horizontal walls of the support tubes. Flat elements 69 between the sides of the brakeshoe and the adjacent inner walls of the outer tube 12 are spacers which take up clearance between the brakeshoe and tube 12. Disposed at the apex of the brakeshoe sides 66 and 68 is a cylindrical pin 70 secured thereto which extends outwardly therefrom through an opening 71 formed in the lower right hand edge of the support tube 12. Pin 70 projects into a central passage of a projecting cylindrical adaptor 74 which is welded to the corner edge of the outer support tube 12. The outer end of adaptor 74 is internally threaded for connection with the threaded extension 78 of a housing 79 of a toggle clamp assembly 80. This toggle clamp assembly may be a suitable commercial unit such as the DE-STA-CO Corp. toggle clamp model 624 and preferably has a plunger 84 that is mounted for reciprocal movement in the housing 79. The housing has a pair of side links 86 having one end pivoted at 87 to the housing 79. The other ends of side links 86 are pivoted at 90 to a handle assembly 92 having crank arms 94. The ends of these crank arms are attached by pivot 96 to the end plunger 84 as best shown in FIGS. 3 and 4. When the handle 92 is turned to the full-line, over-center position shown in FIGS. 3 and 4, the plunger is moved to its inner most position to force the brakeshoe diagonally inwardly and thereby force the far walls of inner tube 32 against the corresponding inner walls of the outer tube 12. With this internal clamping action, the inner tube is frictionally secured to the outer tube without any play or lash. By moving the handle approximately 30° to the phantom line position shown in FIG. 1, the plunger is withdrawn by the crank of the handle assembly so that the brakeshoe is released. With the release of this pressure, the column can be adjusted to a new position and subsequently frictionally locked to suit the operator's requirements.

While a preferred embodiment and modification of this invention have been shown and described in detail, it will be understood that further modifications might be resorted to without departing from the scope of the invention as defined in the following claims.

I claim:

1. An adjustable steering column for a vehicle comprising a first tubular member rectilinear in cross section, fastener means for attaching one end of said first tubular member to the vehicle, a second tubular member rectilinear in cross section mounted for sliding telescopic movement with respect to said first tubular member, a steering column housing secured to the projecting end of said second tubular member and projecting therefrom, a steering wheel supported at the upper end of said steering column housing, a steering shaft attached to said steering wheel extending through said steering column, a brakeshoe operatively disposed between the inner and outer tubular members, and actuator means operatively connected to said brakeshoe for exerting a diagonal force across said tubular members so that two adjacent surfaces of said members are in close frictional engagement with each other to thereby releasably couple said tubular members at an adjusted telescoped position and the steering wheel at a selected translated position with respect to said outer support member.

2. An adjustable steering column for a vehicle comprising a first tubular member rectilinear in cross section, fastener means for attaching one end of said first tubular member to the vehicle, a second tubular member rectilinear in cross section mounted for sliding telescopic movement with respect to said first tubular member, a steering column housing secured to the projecting end of said second tubular member and projecting therefrom, a steering wheel supported at the upper end of said steering column housing, a steering shaft attached to said steering wheel extending through said steering column, an angular brakeshoe operatively disposed internally of said first tubular member between the inner and outer tubular members, and actuator means operatively connected to said brakeshoe for exerting a diagonal force across said tubular members so that adjacent right angular surfaces of one of said members are in close frictional engagement with corresponding right angular surfaces of the other of said members to thereby tightly connect said tubular members at an adjusted telescoped position and the steering wheel at a selected translated position with respect to said outer support member.

3. An adjustable steering column for a vehicle having dirigible wheels comprising a steering shaft having upper and lower ends, a manual wheel secured to an upper end of said steering shaft, a column housing surrounding said steering shaft and supporting said steering shaft for limited turning movement therein, a translating assembly supporting said column housing for linear movement between fully retracted and fully extended positions, said translating assembly comprising first and second tubular members having clearance therebetween and mounted for telescopic movement with respect to one another, support means securing said first tubular member in said vehicle, a brakeshoe mounted in the clearance between said tubular members, and actuator means mounted on said first tubular member and operatively connected to said brakeshoe and selectively operable to displace said brakeshoe against the outer side surface of said second tubular member to trap said second tubular member between said brakeshoe and the opposing linear wall of said first member to thereby secure said first and second tubular members in a selected adjusted position.

4. An adjustable steering column for a vehicle having dirigible wheels comprising a steering shaft having upper and lower ends, a manual wheel secured to an upper end of said steering shaft, a column housing surrounding said steering shaft and supporting said steering shaft for limited turning movement therein, a translating assembly supporting said column housing for linear movement between fully retracted and fully extended positions, said translating assembly comprising first and second tubular members having clearance therebetween and mounted for telescopic movement with respect to one another, support means securing said first tubular member in said vehicle, an angular brakeshoe mounted in the clearance between said tubular members for engaging the right angular walls of said second tubular members, and actuator means mounted on said first tubular member and operatively connected to said brakeshoe and selectively operable to displace said brakeshoe diagonally against the outer side surface of said second tubular member to trap said second tubular member between said brakeshoe and the opposing wall of said first member to thereby frictionally secure said first and second tubular members in a selected adjusted position.

* * * * *